United States Patent
Lee et al.

(10) Patent No.: US 10,362,563 B2
(45) Date of Patent: Jul. 23, 2019

(54) METHOD FOR DEACTIVATING SCELLS UPON A TAT EXPIRY FOR PUCCH CELL IN A CARRIER AGGREGATION SYSTEM AND A DEVICE THEREFOR

(71) Applicant: LG Electronics Inc., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/542,495

(22) PCT Filed: Jan. 21, 2016

(86) PCT No.: PCT/KR2016/000641
§ 371 (c)(1),
(2) Date: Jul. 10, 2017

(87) PCT Pub. No.: WO2016/126027
PCT Pub. Date: Aug. 11, 2016

(65) Prior Publication Data
US 2018/0288760 A1    Oct. 4, 2018

Related U.S. Application Data

(60) Provisional application No. 62/112,146, filed on Feb. 4, 2015.

(51) Int. Cl.
*H04W 4/00* (2018.01)
*H04W 72/04* (2009.01)
(Continued)

(52) U.S. Cl.
CPC ....... *H04W 72/0413* (2013.01); *H04L 1/1854* (2013.01); *H04L 1/1887* (2013.01);
(Continued)

(58) Field of Classification Search
CPC .......... H04W 72/0413; H04W 52/0129; H04L 1/1854
See application file for complete search history.

(56) References Cited

U.S. PATENT DOCUMENTS 9,185,611 B2 * 11/2015 Zeng ................. H04W 74/0833
2013/0114574 A1 * 5/2013 Ng ..................... H04W 56/0015
370/336

(Continued)

FOREIGN PATENT DOCUMENTS

WO    2014/110813 A1    7/2014

OTHER PUBLICATIONS

ZTE: "Discussion on the impact for the support of PUCCH on SCell", R2-150151, 3GPP TSG RAN WG2 Meeting #89, Athens, Greece, Feb. 9-13, 2015, pp. 3-4.

(Continued)

*Primary Examiner* — Bo Hui A Zhu
(74) *Attorney, Agent, or Firm* — Dentons US LLP (57) ABSTRACT

The present invention relates to a wireless communication system. More specifically, the present invention relates to a method and a device for deactivating SCells upon a TAT expiry for PUCCH cell in a carrier aggregation system, the method comprising: configuring a first cell with Physical Uplink Control Channel (PUCCH) resource in a PUCCH group and in a Timing Advance Group (TAG) with a configured Time Alignment Timer (TAT), wherein the first cell and zero or more second cells belong to the PUCCH group, and the first cell and zero or more third cells belong to the TAG; starting the TAT of the TAG; and deactivating all cells belonging to the PUCCH group when the TAT expires.

17 Claims, 7 Drawing Sheets

(51) Int. Cl.
*H04L 1/18* (2006.01)
*H04W 52/02* (2009.01)
*H04L 5/00* (2006.01)

(52) U.S. Cl.
CPC ............ *H04L 5/001* (2013.01); *H04L 5/0032* (2013.01); *H04L 5/0053* (2013.01); *H04L 5/0082* (2013.01); *H04W 52/0219* (2013.01); *H04L 5/0048* (2013.01); *Y02D 70/1224* (2018.01); *Y02D 70/1242* (2018.01); *Y02D 70/1262* (2018.01); *Y02D 70/1264* (2018.01); *Y02D 70/23* (2018.01); *Y02D 70/24* (2018.01)

(56) References Cited

U.S. PATENT DOCUMENTS

2013/0279486 A1* 10/2013 Kato ................. H04W 56/0005
370/336
2014/0016593 A1* 1/2014 Park ........................ H04L 5/001
370/329

OTHER PUBLICATIONS

Fujitsu: "Discussion on the PUCCH support on SCell", R2-150238, 3GPP TSG RAN WG2 Meeting #89, Athens, Greece, Feb. 9-13, 2015, pp. 2-3.
Intel Corporation: "Considerations for PUCCH on SCell in carrier aggregation", R2-150169, 3GPP TSG RAN WG2 Meeting #89, Athens, Greece, Feb. 9-13, 2015, p. 3.
ZTE: "Activation/Deactivation for SCell carrying PUCCH", R2-150150, 3GPP TSG RAN WG2 Meeting #89, Athens, Greece, Feb. 9-13, 2015, pp. 1-3.

* cited by examiner

(a) Control-Plane Protocol Stack (b) User-Plane Protocol Stack

◇ : PUCCH SCell

◇ : non-PUCCH SCell

[Fig. 10B]

◇ : PUCCH SCell

◇ : non-PUCCH SCell

[Fig. 11]

METHOD FOR DEACTIVATING SCELLS UPON A TAT EXPIRY FOR PUCCH CELL IN A CARRIER AGGREGATION SYSTEM AND A DEVICE THEREFOR

This application is a 35 USC § 371 National Stage entry of International Application No. PCT/KR2016/000641 filed on Jan. 21, 2016, and claims priority to U.S. Provisional Application No. 62/112,146 filed on Feb. 4, 2015, all of which are hereby incorporated by reference in their entireties as if fully set forth herein.

TECHNICAL FIELD

The present invention relates to a wireless communication system and, more particularly, to a method for deactivating SCells upon a TAT expiry for PUCCH cell in a carrier aggregation system and a device therefor.

BACKGROUND ART

As an example of a mobile communication system to which the present invention is applicable, a 3rd Generation Partnership Project Long Term Evolution (hereinafter, referred to as LTE) communication system is described in brief.

Figure 1:
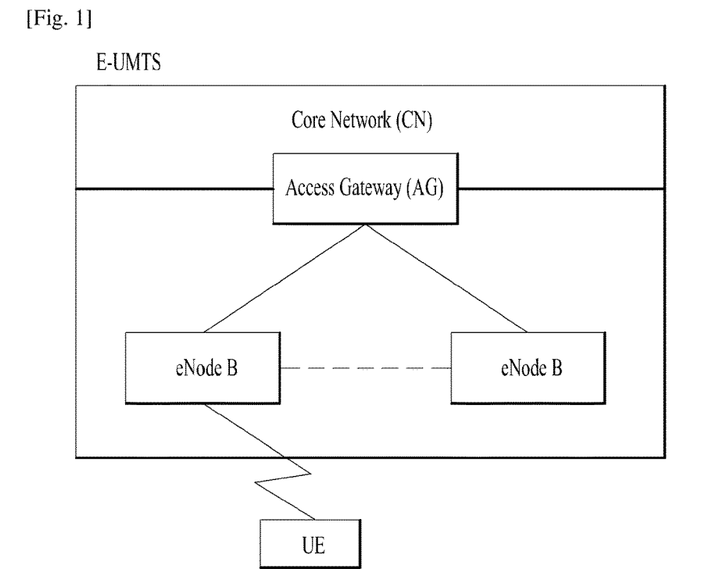
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for deactivating SCells upon a TAT expiry for PUCCH cell in a carrier aggregation system. The technical problems solved by the present invention are not limited to the above technical problems and those skilled in the art may understand other technical problems from the following description.

Solution to Problem

The object of the present invention can be achieved by providing a method for a UE operating in a wireless communication system, the method comprising: configuring a first cell with Physical Uplink Control Channel (PUCCH) resource in a PUCCH group and in a Timing Advance Group (TAG) with a configured Time Alignment Timer (TAT), wherein the first cell and zero or more second cells belong to the PUCCH group, and the first cell and zero or more third cells belong to the TAG; starting the TAT of the TAG; and deactivating all cells belonging to the PUCCH group when the TAT expires.

In another aspect of the present invention provided herein is an apparatus in the wireless communication system, the apparatus comprising: a Radio Frequency (RF) module; and a processor configured to control the RF module, wherein the processor is configured to configure a first cell with Physical Uplink Control Channel (PUCCH) resource in a PUCCH group and in a Timing Advance Group (TAG) with a configured Time Alignment Timer (TAT), wherein the first cell and zero or more second cell belong to the PUCCH group, and the first cell and zero or more third cell belong to the TAG, to start the TAT of the TAG, and to deactivate all cells belonging to the PUCCH group when the TAT expires.

Preferably, all cells in the PUCCH group are all activated cells.

Preferably, the UE deactivates all cells belonging to the PUCCH group when the TAT stops.

Preferably, one or more second cells belonging to the PUCCH group and one or more third cells belonging to the TAG are different cells.

Preferably, the UE deactivates all cells including the first cell belonging to the PUCCH group when the TAT expires.

Preferably, the UE deactivates all cells except for the first cell belonging to the PUCCH group when the TAT expires.

Preferably, when the UE deactivates all cells except for the first cell belonging to the PUCCH group, the UE doesn't transmit Sounding Reference Signal (SRS), Uplink-Shared Channel (UL-SCH), or Random Access Channel (RACH), or the UE doesn't report Channel Status Information (CSI) on a deactivated cell, or the UE doesn't monitor a Physical Downlink Control Channel (PDCCH) on the deactivated cell, or the UE doesn't monitor a PDCCH for the deactivated cell.

Preferably, when UE deactivates all cells including the first cell belonging to the PUCCH group, the UE flushes Hybrid-ARQ (HARQ) buffer of all cells including the first cell belonging to the PUCCH group.

Preferably, when the UE deactivates all cells except for the first cell belonging to the PUCCH group, the UE flushes Hybrid-ARQ (HARQ) buffer of the all cells except for the first cell belonging to the PUCCH group.

Preferably, when the TAT of the TAG starts, the UE activates all cells belonging to the PUCCH group.

Preferably, when the UE activates the all cells belonging to the PUCCH group, the UE transmits Sounding Reference Signal (SRS), or the UE reports Channel Status Information (CSI) on an activated cell, or the UE monitors a Physical Downlink Control Channel (PDCCH) on the activated cell, or the UE monitors a PDCCH for the activated cell.

It is to be understood that both the foregoing general description and the following detailed description of the present invention are exemplary and explanatory and are intended to provide further explanation of the invention as claimed.

Advantageous Effects of Invention

According to the present invention, deactivating SCells upon a TAT expiry for PUCCH cell can be efficiently performed in a carrier aggregation system. Specifically, if PUCCH cell belongs to a PUCCH group and a TAG, when timeAlignmentTimer (TAT) of the TAG to which the PUCCH Cell belongs expires, the UE can deactivate all activated cells in the PUCCH group to which that PUCCH cell belongs.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2A:
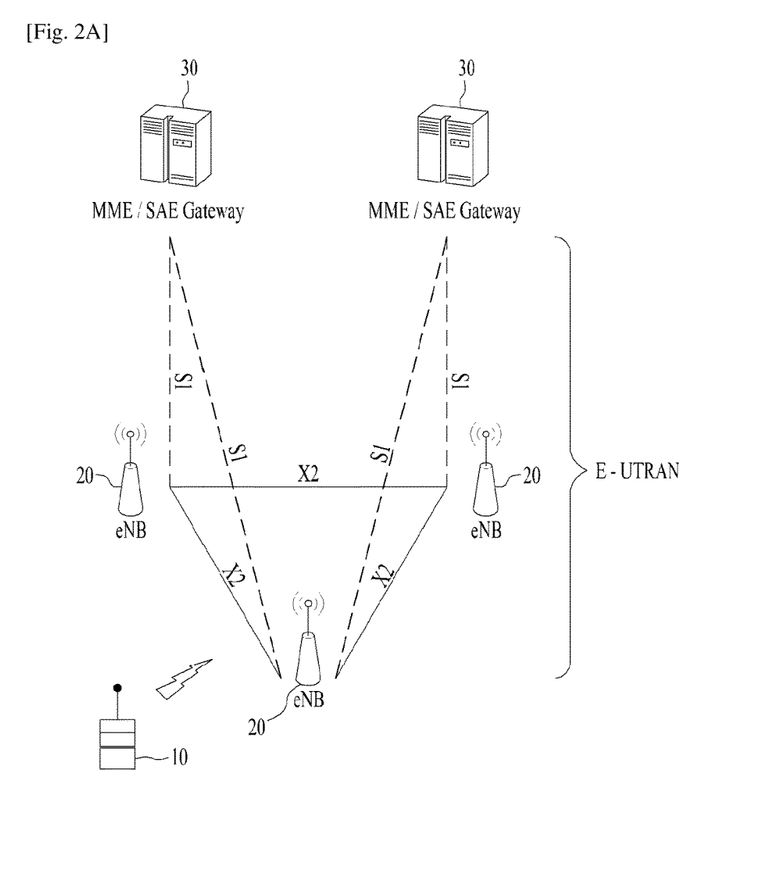
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
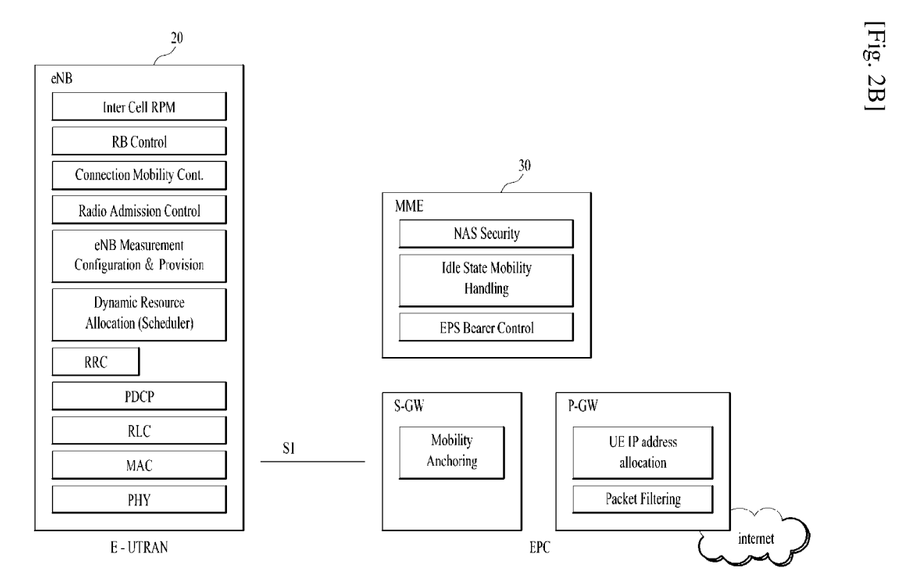
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
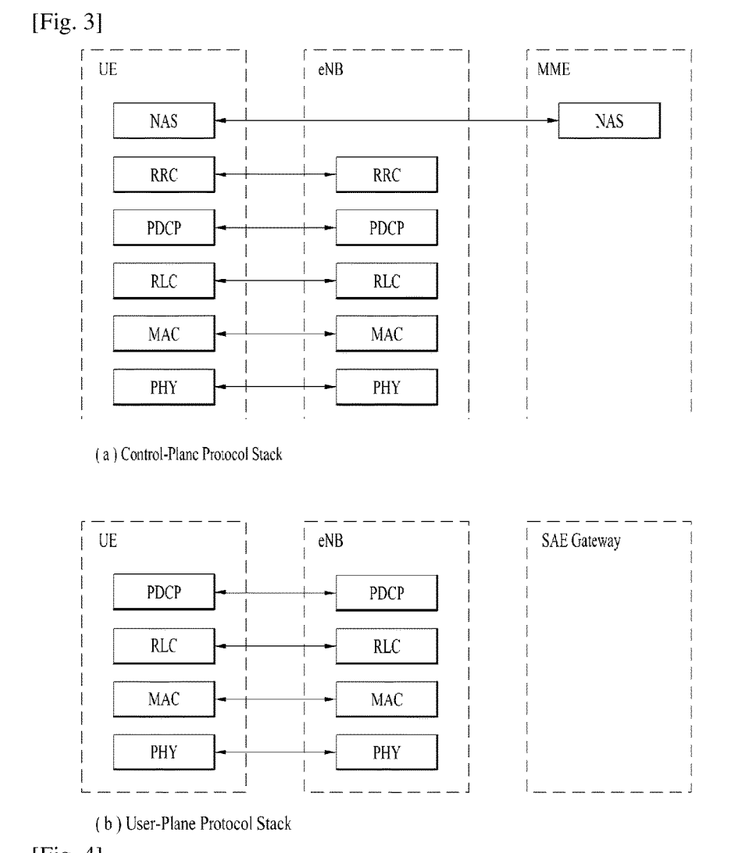
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
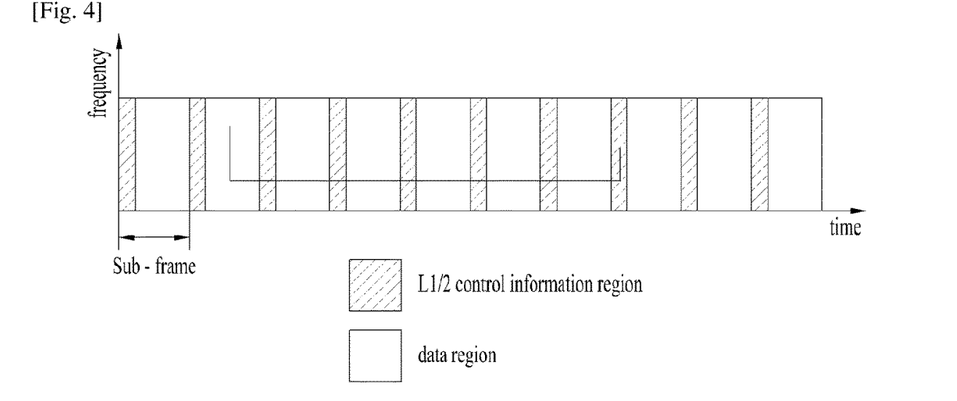
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
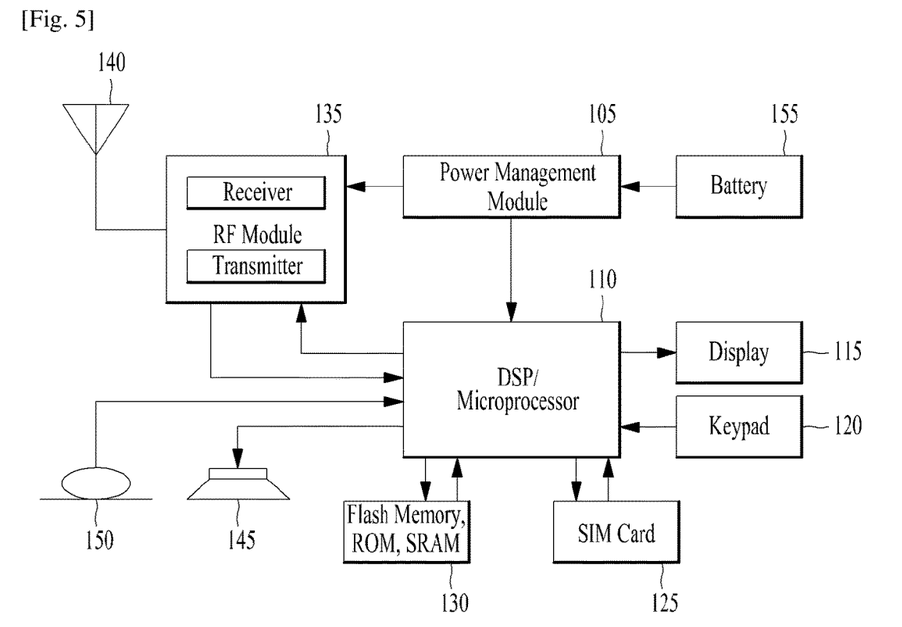
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure (s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals).

Figure 6:
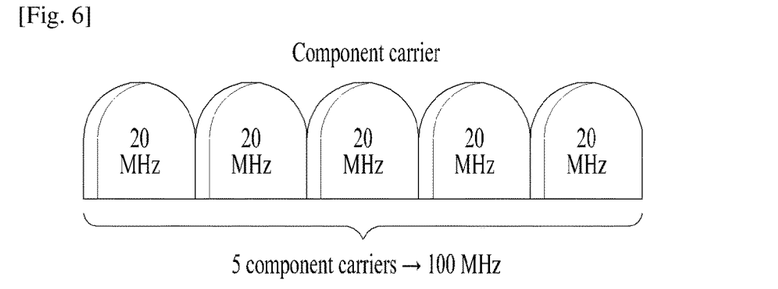
FIG. 6 is a diagram for carrier aggregation.

FIG. 6 is a diagram for carrier aggregation.

Carrier Aggregation (CA) technology for supporting multiple carriers is described with reference to FIG. 6 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

When CA is configured, the UE only has one RRC connection with the network. At RRC connection establishment/re-establishment/handover, one serving cell provides the NAS mobility information (e.g. TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

A UE may simultaneously receive or transmit on one or multiple CCs depending on its capabilities:

A UE with single timing advance capability for CA can simultaneously receive and/or transmit on multiple CCs corresponding to multiple serving cells sharing the same timing advance (multiple serving cells grouped in one TAG);

A UE with multiple timing advance capability for CA can simultaneously receive and/or transmit on multiple CCs corresponding to multiple serving cells with different timing advances (multiple serving cells grouped in multiple TAGs). E-UTRAN ensures that each TAG contains at least one serving cell;

A non-CA capable UE can receive on a single CC and transmit on a single CC corresponding to one serving cell only (one serving cell in one TAG).

CA is supported both between same and different duplex CCs.

It is possible to configure a UE to aggregate a different number of CCs originating from the same eNB and of possibly different bandwidths in the UL and the DL:

The number of DL CCs that can be configured depends on the DL aggregation capability of the UE;

The number of UL CCs that can be configured depends on the UL aggregation capability of the UE;

It is not possible to configure a UE with more UL CCs than DL CCs;

In typical TDD deployments, the number of CCs and the bandwidth of each CC in UL and DL is the same.

The number of TAGs that can be configured depends on the TAG capability of the UE.

CCs originating from the same eNB need not to provide the same coverage.

For TDD CA, the downlink/uplink configuration is identical across component carriers in the same band and may be the same or different across component carriers in different bands.

The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The configured set of serving cells for a UE therefore always consists of one PCell and one or more SCells:

For each SCell the usage of uplink resources by the UE in addition to the downlink ones is configurable (the number of DL SCCs configured is therefore always larger than or equal to the number of UL SCCs and no SCell can be configured for usage of uplink resources only);

From a UE viewpoint, each uplink resource only belongs to one serving cell;

The number of serving cells that can be configured depends on the aggregation capability of the UE;

PCell can only be changed with handover procedure (i.e. with security key change and RACH procedure);

PCell is used for transmission of PUCCH;

Unlike SCells, PCell cannot be de-activated;

Re-establishment is triggered when PCell experiences RLF, not when SCells experience RLF;

NAS information is taken from PCell.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

The reconfiguration, addition and removal of SCells can be performed by RRC. At intra-LTE handover, RRC can also add, remove, or reconfigure SCells for usage with the target PCell. When adding a new SCell, dedicated RRC signalling is used for sending all required system information of the SCell i.e. while in connected mode, UEs need not acquire broadcasted system information directly from the SCells.

To enable reasonable UE battery consumption when CA is configured, an activation/deactivation mechanism of SCells is supported (i.e. activation/deactivation does not apply to PCell). When a SCell is deactivated, the UE does not need to receive the corresponding PDCCH or PDSCH, cannot transmit in the corresponding uplink, nor is it required to perform CQI measurements. Conversely, when a SCell is active, the UE shall receive PDSCH and PDCCH (if the UE is configured to monitor PDCCH from this SCell), and is expected to be able to perform CQI measurements.

The activation/deactivation mechanism is based on the combination of a MAC control element and deactivation timers. The MAC control element carries a bitmap for the activation and deactivation of SCells: a bit set to 1 denotes activation of the corresponding SCell, while a bit set to 0 denotes deactivation. With the bitmap, SCells can be activated and deactivated individually, and a single activation/deactivation command can activate/deactivate a subset of the SCells. One deactivation timer is maintained per SCell but one common value is configured per UE by RRC.

At reconfiguration without mobility control information:
SCells added to the set of serving cells are initially "deactivated";
SCells which remain in the set of serving cells (either unchanged or reconfigured) do not change their activation status ("activated" or "deactivated").

At reconfiguration with mobility control information (i.e. handover):
SCells are "deactivated".

In DC, the serving cells of the MCG other than the PCell can only be activated/deactivated by the MAC Control Element received on MCG, and the serving cells of the SCG other than PSCell can only be activated/deactivated by the MAC Control Element received on SCG. The MAC entity applies the bitmap for the associated cells of either MCG or SCG. PSCell in SCG is always activated like the PCell (i.e. deactivation timer is not applied to PSCell). One deactivation timer is maintained per SCell but one common value is configured per CG by RRC.

Figure 7:
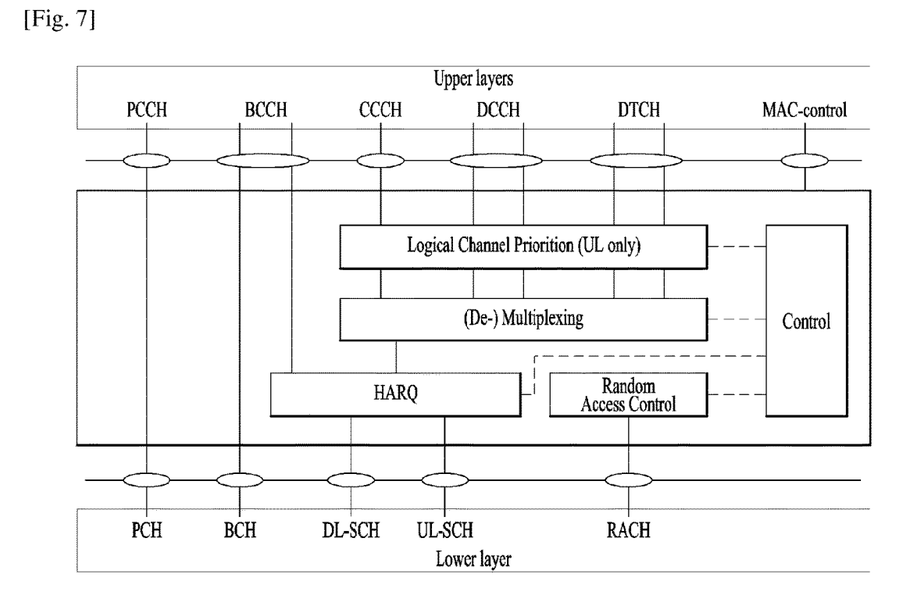
FIG. 7 is a diagram for MAC structure overview in a UE side.

FIG. 7 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical-channel types specified for LTE includes:

The Broadcast Control Channel (BCCH), used for transmission of system information from the network to all terminals in a cell. Prior to accessing the system, a terminal needs to acquire the system information to find out how the system is configured and, in general, how to behave properly within a cell.

The Paging Control Channel (PCCH), used for paging of terminals whose location on a cell level is not known to the network. The paging message therefore needs to be transmitted in multiple cells.

The Common Control Channel (CCCH), used for transmission of control information in conjunction with random access.

The Dedicated Control Channel (DCCH), used for transmission of control information to/from a terminal. This channel is used for individual configuration of terminals such as different handover messages.

The Multicast Control Channel (MCCH), used for transmission of control information required for reception of the MTCH.

The Dedicated Traffic Channel (DTCH), used for transmission of user data to/from a terminal. This is the logical channel type used for transmission of all uplink and non-MBSFN downlink user data.

The Multicast Traffic Channel (MTCH), used for downlink transmission of MBMS services.

From the physical layer, the MAC layer uses services in the form of transport channels. A transport channel is defined by how and with what characteristics the information is transmitted over the radio interface. Data on a transport channel is organized into transport blocks. In each Transmission Time Interval (TTI), at most one transport block of dynamic size is transmitted over the radio interface to/from a terminal in the absence of spatial multiplexing. In the case of spatial multiplexing (MIMO), there can be up to two transport blocks per TTI.

Associated with each transport block is a Transport Format (TF), specifying how the transport block is to be transmitted over the radio interface. The transport format includes information about the transport-block size, the modulation-and-coding scheme, and the antenna mapping. By varying the transport format, the MAC layer can thus realize different data rates. Rate control is therefore also known as transport-format selection.

The following transport-channel types are defined for LTE:

The Broadcast Channel (BCH) has a fixed transport format, provided by the specifications. It is used for transmission of parts of the BCCH system information, more specifically the so-called Master Information Block (MIB).

The Paging Channel (PCH) is used for transmission of paging information from the PCCH logical channel. The PCH supports discontinuous reception (DRX) to allow the terminal to save battery power by waking up to receive the PCH only at predefined time instants. The Downlink Shared Channel (DL-SCH) is the main transport channel used for transmission of downlink data in LTE. It supports key LTE features such as dynamic rate adaptation and channel-dependent scheduling in the time and frequency domains, hybrid ARQ with soft combining, and spatial multiplexing. It also supports DRX to reduce terminal power consumption while still providing an always-on experience. The DL-SCH is also used for transmission of the parts of the BCCH system information not mapped to the BCH. There can be multiple DL-SCHs in a cell, one per terminal scheduled in this TTI, and, in some subframes, one DL-SCH carrying system information.

The Multicast Channel (MCH) is used to support MBMS. It is characterized by a semi-static transport format and semi-static scheduling. In the case of multi-cell transmission using MBSFN, the scheduling and transport format configuration is coordinated among the transmission points involved in the MBSFN transmission.

The Uplink Shared Channel (UL-SCH) is the uplink counterpart to the DL-SCH? that is, the uplink transport channel used for transmission of uplink data.

In addition, the Random-Access Channel (RACH) is also defined as a transport channel, although it does not carry transport blocks.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling? for example, timing-advance commands and random-access response. Control elements are identified with reserved values in the LCID field, where the LCID value indicates the type of control information.

Furthermore, the length field in the sub-header is removed for control elements with a fixed length.

The MAC multiplexing functionality is also responsible for handling of multiple component carriers in the case of carrier aggregation. The basic principle for carrier aggregation is independent processing of the component carriers in the physical layer, including control signaling, scheduling and hybrid-ARQ retransmissions, while carrier aggregation is invisible to RLC and PDCP. Carrier aggregation is therefore mainly seen in the MAC layer, where logical channels, including any MAC control elements, are multiplexed to form one (two in the case of spatial multiplexing) transport block(s) per component carrier with each component carrier having its own hybrid-ARQ entity.

Figure 8:
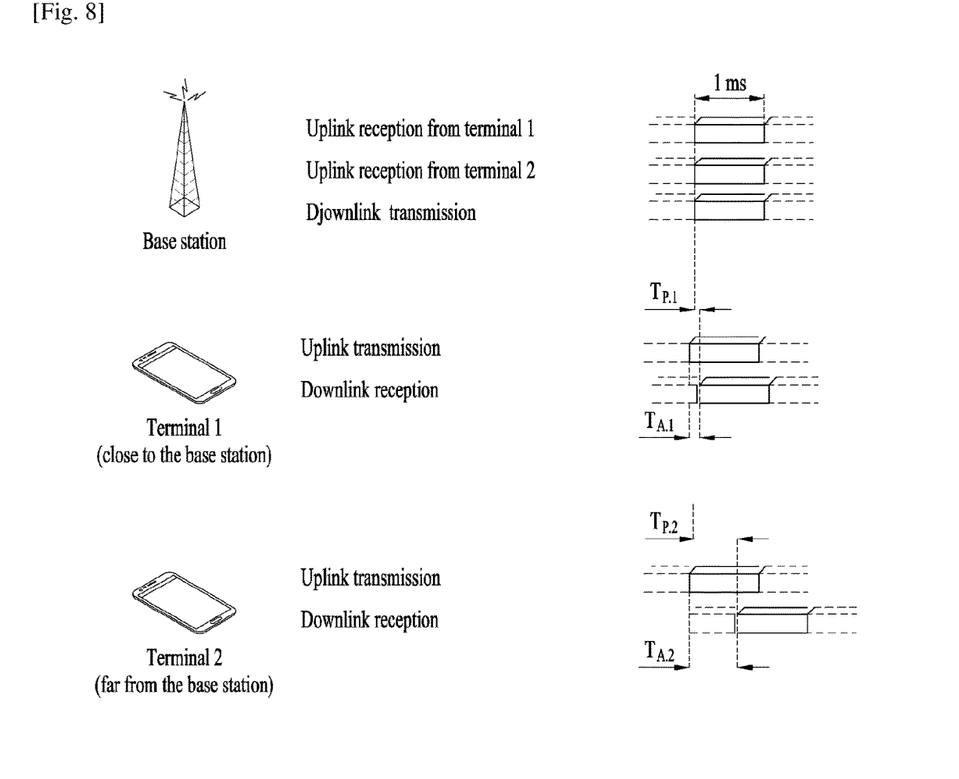
FIG. 8 is a diagram for uplink timing advance.

FIG. 8 is a diagram for uplink timing advance.

The LTE uplink allows for uplink intra-cell orthogonality, implying that uplink transmissions received from different terminals within a cell do not cause interference to each other. A requirement for this uplink orthogonality to hold is that the signals transmitted from different terminals within the same subframe but within different frequency resources (different resource blocks) arrive approxi-mately time aligned at the base station. More specifically, any timing misalignment between received signals received should fall within the cyclic prefix. To ensure such receiver-side time alignment, LTE includes a mechanism for transmit-timing advance. In essence, timing advance is a negative offset, at the terminal, between the start of a received downlink subframe and a transmitted uplink subframe. By controlling the offset appropriately for each terminal, the network can control the timing of the signals received at the base station from the terminals. Terminals far from the base station encounter a larger propagation delay and therefore need to start their uplink transmissions somewhat in advance, compared to terminals closer to the base station, as illustrated in FIG. 8.

In this specific example, the first terminal is located close to the base station and experiences a small propagation delay, TP,1. Thus, for this terminal, a small value of the timing advance offset TA,1 is sufficient to compensate for the propagation delay and to ensure the correct timing at the base station. However, a larger value of the timing advance is required for the second terminal, which is located at a larger distance from the base station and thus experiences a larger propagation delay.

The timing-advance value for each terminal is determined by the network based on measurements on the respective uplink transmissions. Hence, as long as a terminal carries out uplink data transmission, this can be used by the receiving base station to estimate the uplink receive timing and thus be a source for the timing-advance commands. Sounding reference signals can be used as a regular signal to measure upon, but in principle the base station can use any signal transmitted from the terminals.

Based on the uplink measurements, the network determines the required timing correction for each terminal. If the timing of a specific terminal needs correction, the network issues a timing-advance command for this specific terminal, instructing it to retard or advance its timing relative to the current uplink timing. The user-specific timing-advance command is transmitted as a MAC control element on the DL-SCH. The maximum value possible for timing advance is 0.67 ms, corresponding to a terminal-to-base-station distance of slightly more than 100 km. This is also the value assumed when determining the processing time for decoding. Typically, timing-advance commands to a terminal are transmitted relatively infrequently? for example, one or a few times per second.

If the terminal has not received a timing-advance command during a (configurable) period, the terminal assumes it has lost the uplink synchronization. In this case, the terminal must re-establish uplink timing using the random-access procedure prior to any PUSCH or PUCCH transmission in the uplink.

For carrier aggregation, there may be multiple component carriers transmitted from a single terminal. In principle, different timing advance commands for different component carriers could be envisioned. One motivation for this could be inter-band carrier aggregation, where the different component carriers are received at different geographical locations, for example by using remote radio heads for some of the bands but not others. However, such deployments are not common and in the interest of simplicity LTE is using a single timing-advance command valid for all uplink component carriers.

The MAC entity has a configurable timer timeAlignmentTimer per TAG. The timeAlignmentTimer is used to control how long the MAC entity considers the Serving Cells belonging to the associated TAG to be uplink time aligned.

When a Timing Advance Command MAC control element is received, the MAC entity applies the Timing Advance Command for the indicated TAG, and starts or restarts the timeAlignmentTimer associated with the indicated TAG.

When a Timing Advance Command is received in a Random Access Response message for a serving cell belonging to a TAG, if the Random Access Preamble was not selected by the MAC entity, the MAC entity applies the Timing Advance Command for this TAG, and starts or restarts the timeAlignmentTimer associated with this TAG. Else, if the timeAlignmentTimer associated with this TAG is not running, the MAC entity applies the Timing Advance Command for this TAG, starts the timeAlignmentTimer associated with this TAG. In this case, when the contention resolution is considered not successful, the MAC entity stops timeAlignmentTimer associated with this TAG.

Else, the MAC entity ignores the received Timing Advance Command.

When a timeAlignmentTimer expires, if the timeAlignmentTimer is associated with the pTAG, the MAC entity flushes all HARQ buffers for all serving cells, notifies RRC to release PUCCH/SRS for all serving cells, clears any configured downlink assignments and uplink grants, and considers all running timeAlignmentTimers as expired. Else if the timeAlignmentTimer is associated with an sTAG, then for all Serving Cells belonging to this TAG, the MAC entity flushes all HARQ buffers, and notifies RRC to release SRS.

The MAC entity shall not perform any uplink transmission on a Serving Cell except the Random Access Preamble transmission when the timeAlignmentTimer associated with the TAG to which this Serving Cell belongs is not running. Furthermore, when the timeAlignmentTimer associated with the pTAG is not running, the MAC entity shall not perform any uplink transmission on any Serving Cell except the Random Access Preamble transmission on the SpCell.

Figure 9:
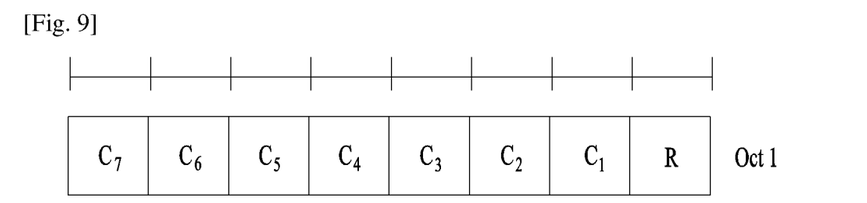
FIG. 9 is a diagram for an activation/deactivation MAC control element.

FIG. 9 is a diagram for an activation/deactivation MAC control element.

If the UE is configured with one or more SCells, the network may activate and deactivate the configured SCells. The PCell is always activated. The network activates and deactivates the SCell(s) by sending the Activation/Deactivation MAC control element. Furthermore, the UE maintains a sCellDeactivationTimer timer per configured SCell and deactivates the associated SCell upon its expiry. The same initial timer value applies to each instance of the sCellDeactivationTimer and it is configured by RRC. The configured SCells are initially deactivated upon addition and after a handover.

The UE configures each SCell to each TTI and for each configured SCell:

If the UE receives an Activation/Deactivation MAC control element in this TTI activating the SCell, the UE may activate the SCell in the TTI. The UE can apply normal SCell operation including i) SRS transmissions on the SCell, ii) CQI/PMI/RI/PTI reporting for the SCell, iii) PDCCH monitoring on the SCell, or iv) PDCCH monitoring for the SCell. Also the UE may start or restart the sCellDeactivationTimer associated with the SCell and trigger PHR.

If the UE receives an Activation/Deactivation MAC control element in this TTI deactivating the SCell, or if the sCellDeactivationTimer associated with the activated SCell expires in this TTI, the UE can deactivate the SCell in the TTI, stop the sCellDeactivationTimer associated with the SCell, and flush all HARQ buffers associated with the SCell.

If PDCCH on the activated SCell indicates an uplink grant or downlink assignment; or if PDCCH on the Serving Cell scheduling the activated SCell indicates an uplink grant or a downlink assignment for the activated SCell, the UE can restart the sCellDeactivationTimer associated with the SCell.

If the SCell is deactivated, the UE will not transmit SRS on the SCell, transmit on UL-SCH on the SCell, transmit on RACH on the SCell, monitor the PDCCH on the SCell, or monitor the PDCCH for the SCell.

HARQ feedback for the MAC PDU containing Activation/Deactivation MAC control element may not be impacted by PCell interruption due to SCell activation/deactivation.

The Activation/Deactivation MAC control element is identified by a MAC PDU subheader with LCID as specified in table 1. It has a fixed size and consists of a single octet containing seven C-fields and one R-field. The Activation/Deactivation MAC control element is defined as FIG. 9

TABLE 1

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Ci field indicates the activation/deactivation status of the SCell with SCellIndex i, if there is an SCell configured with SCellIndex i. Else, the UE may ignore the Ci field. The Ci field is set to "1" to indicate that the SCell with SCellIndex i shall be activated. The Ci field is set to "0" to indicate that the SCell with SCellIndex i shall be deactivated. R field is a reserved bit, and set to '0'.

The sCellDeactivationTimer is a SCell deactivation timer. Value in number of radio frames. Value rf4 corresponds to 4 radio frames, value rf8 corresponds to 8 radio frames and so on. E-UTRAN only configures the field if the UE is configured with one or more SCells other than the PSCell. If the field is absent, the UE shall delete any existing value for this field and assume the value to be set to infinity. The same value applies for each SCell of a Cell Group (i.e. MCG or SCG) (although the associated functionality is performed independently for each SCell).

In Rel-11 carrier aggregation (CA), a TAG was introduced to support multiple timing advances for a UE. A TAG is defined as a group of serving cells that is configured by RRC and that, for the cells with an UL configured, use the same timing reference cell and the same Timing Advance value. For maintenance of uplink timing of a TAG, timeAlignmentTimer (TAT) is configured per TAG.

In legacy system, if the timeAlignmentTimer associated with the pTAG expires, the UE shall flush all HARQ buffers for all serving cells, notify RRC to release PUCCH/SRS for all serving cells, clear any configured downlink assignments and uplink grants, and consider all running timeAlignmentTimers as expired.

If the timeAlignmentTimer associated with an sTAG expires, then for all Serving Cells belonging to this TAG, the UE shall flush all HARQ buffers, and notify RRC to release SRS.

In Rel-13, for CA enhancement, 3GPP starts an WI on LTE Carrier Aggregation Enhancement Beyond 5 Carriers. In this WI, PUCCH Group is introduced. A PUCCH Group refers a group of one serving cell configured with PUCCH (herein, it is PUCCH Cell) resource and zero or more serving cells. In a PUCCH Group, the PUCCH Cell conveys HARQ feedbacks of all serving cells. Also, 3GPP is considering support of SR on the PUCCH Cell in addition to the SR on PCell, and cross-carrier scheduling only within the PUCCH group.

Since TAG and PUCCH Group have different purposes, there is no need to make the TAG to be aligned with the PUCCH Group. Then, there could be a case that a PUCCH Cell belongs to a PUCCH Group with one serving cell while the PUCCH Cell belongs to a TAG with another serving cell.

If a TAT of TAG for PUCCH Cell expires, depending on whether the TAG is pTAG or not, the UL/DL transmission on PUCCH Cell would be prevented and PUCCH resource may be de-configured from the PUCCH Cell. As a result, the cells belong to the same PUCCH Group would suffer from delayed data transmission if data transmission is not prevented on those cells. In this case, performing the UE behavior for TAT expiry even for those cells is not desirable because TAT of TAG for those cells may still be running Thus, a new mechanism is needed to prevent UL/DL data transmission on those cells for a while.

Figure 10A:
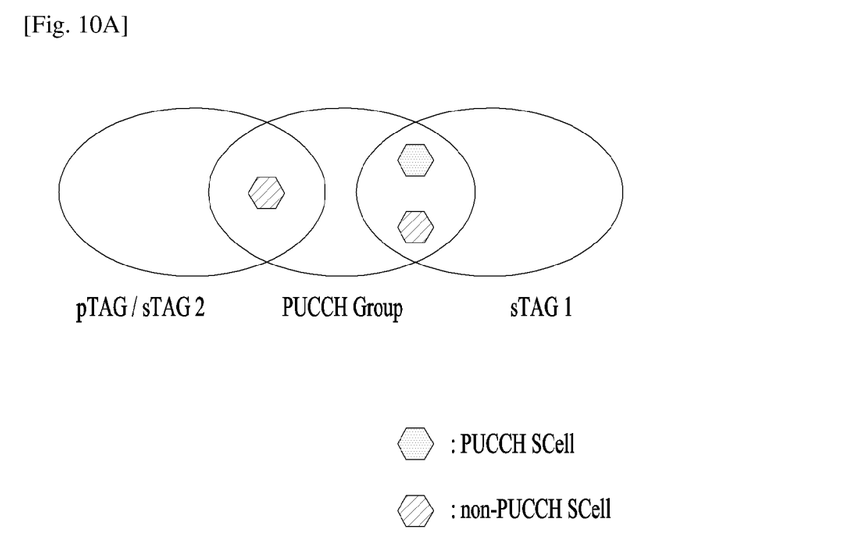
FIGS. 10A and 10B are examples of TAG and PUCCH Group configuration in a carrier aggregation system.
Figure 10B:
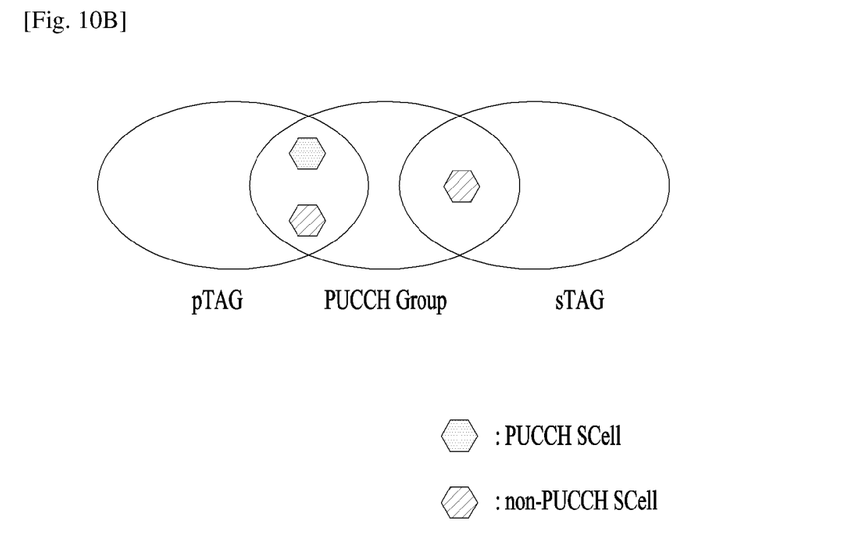

FIGS. 10A and 10B are examples of TAG and PUCCH group configuration in a carrier aggregation system.

As mentioned above, in Rel-13, by supporting PUCCH configuration on an SCell, it seems straightforward that the UE notify RRC to release PUCCH as well as SRS when TAT of an sTAG expires.

By configuring TAG and PUCCH Group independently, the SCell in the PUCCH Group could belong to either the TAG to which PUCCH SCell belongs or the TAG to which PUCCH SCell does not belong.

Regarding FIG. 10A, PUCCH SCell belongs to sTAG 1, one SCell belongs to sTAG 1 while the other SCell belongs to either pTAG or sTAG 2. All SCells here are assumed to be in the same PUCCH Group. When TAT of sTAG 1 expires, for the cells belong to sTAG 1, the UE shall apply the legacy UE behavior for TAT of sTAG expiry, i.e., flush HARQ buffers and notify RRC to release SRS. Additionally, the UE shall notify RRC to release PUCCH. Accordingly, PUCCH transmission in the PUCCH Group would not be possible. Thus, DL transmission on the SCells in the PUCCH Group should be stopped.

In order to stop DL transmission on the SCells in the PUCCH Group, applying TAT expiry behavior even to the SCell which belongs to other TAG, i.e., pTAG or sTAG 2, is not desirable because TAT of that TAG would still be running and TAT expiry behavior mainly related to uplink timing not DL transmission. Alternatively, deactivation of the SCells in the PUCCH Group can be used given that deactivation has already been used for stopping DL transmission from Rel-10. As TAT expiry could happen without the eNB knowing this, it would be better that the UE deactivates all SCells including PUCCH SCell in the PUCCH Group rather than relying on the eNB to deactivate all SCells in the PUCCH Group.

Regarding FIG. 10B, PUCCH SCell belongs to pTAG, one SCell belongs to pTAG while the other SCell belongs to either pTAG or sTAG. All SCells here are assumed to be in the same PUCCH Group.

When TAT of pTAG expires, for all cells configured for the UE, the UE shall apply the legacy UE behavior for TAT of pTAG expiry, which still allows PDCCH monitoring. Considering that the UE can be configured with more than 5 CCs, it is not desirable to monitor PDCCH even though the UE cannot transmit HARQ feedback for DL transmission. Thus, when TAT of pTAG expires, it would be good to deactivate all SCells configured for the UE. With the same reason for Case of FIG. 10A, it would be good that the UE deactivates all SCells configured for the UE.

In conclusion, when TAT of sTAG to which a PUCCH SCell belongs expires, the UE deactivates all SCells including the PUCCH SCell in the PUCCH Group of the PUCCH SCell, and when TAT of pTAG expires, the UE deactivates all SCells configured for the UE.

Figure 11:
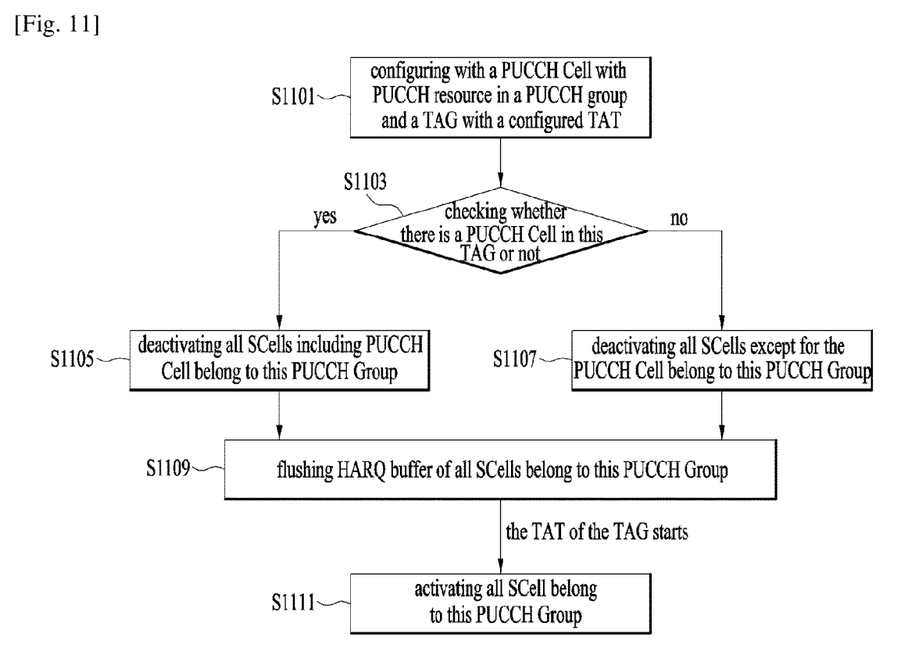
FIG. 11 is a conceptual diagram for deactivating SCells upon a TAT expiry for PUCCH cell in a carrier aggregation system according to embodiments of the present invention.

FIG. 11 is a conceptual diagram for deactivating SCells upon a TAT expiry for PUCCH cell in a carrier aggregation system according to embodiments of the present invention.

In this invention, if PUCCH Cell belongs to a PUCCH Group and a TAG, when timeAlignmentTimer (TAT) of the TAG to which the PUCCH Cell belongs expires, the UE shall deactivate all activated cells in the PUCCH group to which that PUCCH Cell belongs.

The UE is configured a PUCCH Cell with PUCCH resource in a PUCCH group and a TAG with a configured TAT, wherein the PUCCH Cell and zero or more cell belong to the PUCCH group, and the PUCCH Cell and zero or more cell belong to the TAG (S1101).

Preferably, the cells belong to the PUCCH Group and the cells belong to the TAG may or may not be the same cells. And all cells in the PUCCH group are all activated cells.

When the TAT of the TAG expires, the UE deactivate all cells belonging to the PUCCH group.

In detail, when a TAT of a TAG expires or stops (including TAT of a TAG is considered as expired), for the TAG, the UE checks whether there is a PUCCH Cell in this TAG or not (S1103).

If there is a PUCCH Cell in this TAG, for the PUCCH Group to which the PUCCH Cell belongs, the UE shall deactivate all SCells including PUCCH Cell, if activated, belong to this PUCCH Group (S1105), or the UE shall deactivate all SCells except for the PUCCH Cell, if activated, belong to this PUCCH Group (S1107).

When the UE deactivates all SCells except for the PUCCH Cell, the UE doesn't transmit Sounding Reference Signal (SRS), Uplink-Shared Channel (UL-SCH), or Random Access Channel (RACH), or the UE doesn't report Channel Status Information (CSI) on a deactivated cell, or the UE doesn't monitor a Physical Downlink Control Channel (PDCCH) on the deactivated cell, or the UE doesn't monitor a PDCCH for the deactivated cell.

Additionally, the UE can flush HARQ buffer of all SCells including PUCCH Cell belong to this PUCCH Group or flush HARQ buffer of all SCells except for PUCCH Cell belong to this PUCCH Group when the TAT of a TAG expires or stops (S1109).

When the TAT of the TAG starts, while the TAT of the TAG is not running, the UE shall activate all SCell, if deactivated, belong to this PUCCH Group (S1111). In this case, the UE transmits Sounding Reference Signal (SRS), or the UE reports Channel Status Information (CSI) on an activated cell, or the UE monitors a Physical Downlink Control Channel (PDCCH) on the activated cell, or the UE monitors a PDCCH for the activated cell.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
configuring a first cell with Physical Uplink Control Channel (PUCCH) resource,
wherein the first cell is both in a PUCCH group and in a Timing Advance Group (TAG) with a Time Alignment Timer (TAT),
wherein the PUCCH group includes the first cell and at least one second cell, and
wherein the second cell has a different time advance with the first cell;
starting the TAT of the TAG; and
deactivating the second cell based on that the TAT expires or stops.

2. The method according to claim 1, wherein the second cell is activated before deactivating.

3. The method according to claim 1, wherein the TAG includes the first cell and a third cell, and
wherein the second cell belonging to the PUCCH group and the third cell belonging to the TAG are different.

4. The method according to claim 1, further comprising: deactivating all cells belonging to the PUCCH group based on that the TAT expires or stops.

5. The method according to claim 1, further comprising: deactivating all cells except for the first cell belonging to the PUCCH group based on that the TAT expires or stops.

6. The method according to claim 1, further comprising: flushing Hybrid-ARQ (HARQ) buffer of the second cell.

7. The method according to claim 4, further comprising: flushing Hybrid-ARQ (HARQ) buffer of the all cells belonging to the PUCCH group.

8. The method according to claim 1, further comprising: activating the second cell after starting the TAT of the TAG.

9. The method according to claim 8, further comprising: after activating the second cell,
transmitting Sounding Reference Signal (SRS), or
reporting Channel Status Information (CSI) on an activated cell, or
monitoring a Physical Downlink Control Channel (PDCCH) on the activated cell, or
monitoring a PDCCH for the activated cell.

10. A User Equipment (UE) operating in a wireless communication system, the UE comprising:
a transmitter and a receiver; and
a processor, operatively coupled to the transmitter and the receiver, configured to control the transmitter and the receiver,
wherein the processor is further configured to:
configure a first cell with Physical Uplink Control Channel (PUCCH) resource,
wherein the first cell is both in a PUCCH group and in a Timing Advance Group (TAG) with a Time Alignment Timer (TAT),
wherein the PUCCH group includes the first cell and at least one second cell, and
wherein the second cell has a different time advance with the first cell,
start the TAT of the TAG, and
deactivate the second cell based on that the TAT expires or stops.

11. The UE according to claim 10, wherein the second cell are activated before deactivating.

12. The UE according to claim 10, wherein the TAG includes the first cell and a third cell, and
wherein the second cell belonging to the PUCCH group and the third cell belonging to the TAG are different.

13. The UE according to claim 10, wherein the processor is further configured to:
deactivate all cells belonging to the PUCCH group based on that the TAT expires or stop.

14. The UE according to claim 10, wherein the processor is further configured to:
deactivate all cells except for the first cell belonging to the PUCCH group based on that the TAT expires or stop.

15. The UE according to claim 10, wherein the processor is further configured to:
flush the Hybrid-ARQ (HARQ) buffer of the second cell.

16. The UE according to claim 13, wherein the processor is further configured to:
flush the Hybrid-ARQ (HARQ) buffer of the all cells belonging to the PUCCH group.

17. The UE according to claim 10, wherein the processor is further configured to:
after starting the TAT of the TAG,
activate the second cell, and
transmit Sounding Reference Signal (SRS), or
report Channel Status Information (CSI) on an activated cell, or
monitor a Physical Downlink Control Channel (PDCCH) on the activated cell, or
monitor a PDCCH for the activated cell.

* * * * *